May 13, 1958     E. M. STUBBLEFIELD     2,834,360
HEAT OPERATED APPARATUS
Original Filed July 2, 1952
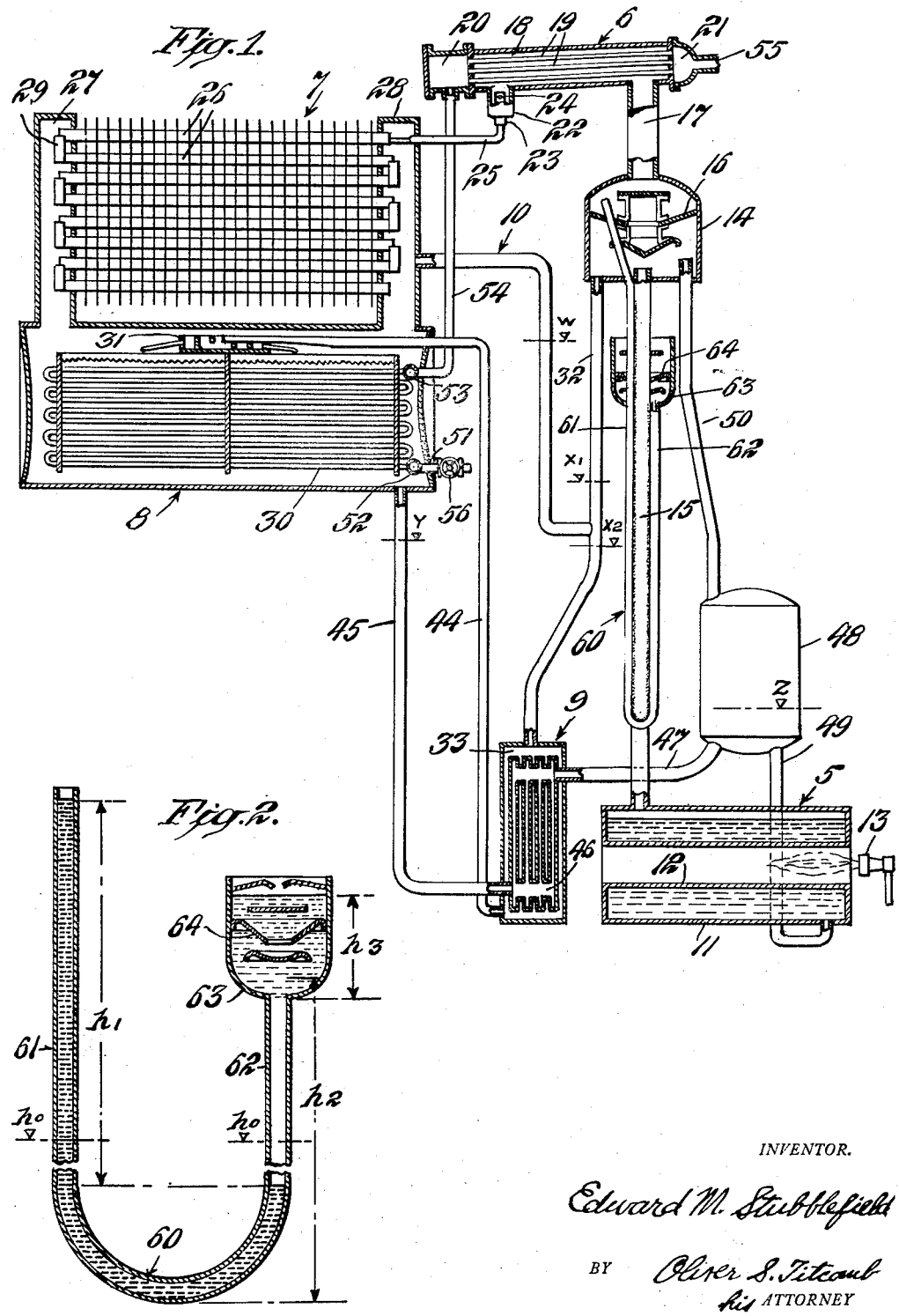
INVENTOR.
Edward M. Stubblefield
BY Oliver S. Titcomb
his ATTORNEY United States Patent Office 2,834,360
Patented May 13, 1958

2,834,360

HEAT OPERATED APPARATUS

Edward M. Stubblefield, Cincinnati, Ohio, assignor, by mesne assignments, to Arkla Air Conditioning Corporation, a corporation of Delaware Continuation of application Serial No. 296,875, July 2, 1952. This application April 23, 1956, Serial No. 580,132

2 Claims. (Cl. 137—72)

This application replaces and is a continuation of my prior application Serial No. 296,875, filed July 2, 1952, now abandoned, and relates back to said prior application on all common subject matter.

The present invention broadly relates to a closed heat operated apparatus such as an air conditioning unit for either heating or cooling and more particularly to a safety device for venting the apparatus at a predetermined pressure therein.

A closed heat operated air conditioning apparatus for both cooling or heating is described and claimed in United States Letters Patent No. 2,557,573 to T. K. Sherwood, issued June 19, 1951 and entitled, Air Conditioning. The apparatus is evacuated of all air and other non-condensable gases and contains a solution of a refrigerant such as water and an absorbent such as lithium bromide. When the absorber and condenser of the apparatus are cooled and heat is applied to the generator, the apparatus operates as an absorption refrigeration system to supply liquid refrigerant to a heat exchanger constituting an evaporator. When the absorber and generator are not cooled and heat is applied to the generator, the apparatus operates as a heating system to deliver hot refrigerant vapor through a bypass to the same heat exchanger which then constitutes a radiator.

Controls are provided to regulate the operation of the apparatus when adjusted for either cooling or heating to prevent either freezing or the generation of excessive pressures in the heat exchanger. However, codes in many localities require a separate safety device for venting pressure vessels at a particular pressure in case the controls do not function properly. It is a common practice to provide a liquid trap to seal parts at different pressures and produce pressure balancing columns of the liquid. Such liquid traps, however, cannot be used as a safety venting device because the liquid is apt to spill if the apparatus is tilted during transit. When this occurs the seal is broken permitting air to enter the apparatus and the working medium to escape.

The principal object of the present invention is to provide a safety device for a closed heat operated apparatus which will hermetically seal the apparatus during inoperative periods and vent the apparatus at a predetermined pressure therein during operative periods.

A further object of the present invention is to provide a safety device in the form of a liquid trap containing a material which is solid at atmospheric temperatures and liquid at any operating temperature of the apparatus requiring relief of internal pressure.

Another object of the invention is to provide a safety device of the type indicated in the form of a liquid trap arranged in thermal contact with a heated portion of the apparatus and containing a low melting temperature alloy for producing a liquid column of a height corresponding to the venting pressure.

Still another object of the invention is to provide a safety device of the type indicated in the form of a liquid trap connecting the interior of the apparatus to the atmosphere and having an element for receiving liquid from the trap when the apparatus vents, delivering liquid to the trap when the pressure is relieved and at all times maintaining a liquid seal.

Still another object of the invention is to provide a safety device of the type indicated which is of simple and compact construction, economical to manufacture and reliable in operation.

These and other objects will become more apparent from the following description and drawing in which like reference characters denote like parts throughout the several views. It is to be expressly understood, however, that the drawing is for the purpose of illustration only and not a definition of the limits of the invention, reference being had for this purpose to the appended claims. In the drawings:

Figure 1 is a diagrammatic view of a heat operated apparatus showing the safety device in thermal contact with the lift tube of the generator; and Figure 2 is an enlarged view of a U-shaped trap like that disclosed in Figure 1 and showing the different levels during cooling, heating and venting.

The present invention is shown applied to a closed heat operated apparatus having various features similar to those described and claimed in United States Letters Patent No. 2,557,573 referred to above and applications of N. E. Berry, Serial No. 286,677, filed May 8, 1952, now abandoned, which is a continuation of Serial No. 703,788 filed October 17, 1946, now abandoned, and Serial No. 164,059, filed May 25, 1950, now Patent No. 2,625,800. Suffice it to state herein that the apparatus comprises a generator 5, a condenser 6, a heat exchanger 7 constituting both a refrigerant evaporator when cooling and a radiator when heating, an absorber 8, a liquid heat exchanger 9 and a bypass conduit 10 interconnected for the circulation of refrigerant and absorbent. The apparatus is evacuated of all air or other non-condensable gases and contains a working fluid such as a water solution of lithium bromide.

The generator 5 comprises a boiler 11 having a flue 12. Flue 12 of boiler 11 is heated by a flame and products of combustion from a burner 13 for any suitable fuel such as the gas burner illustrated. Above the boiler 11 is a separating chamber 14 and a vertically arranged lift tube 15 is connected between the top of the boiler and the bottom of the chamber. Baffles 16 are provided in the separating chamber 14 for separating vapor from liquid and the top of the chamber is connected to the condenser 6 by a vapor pipe 17.

The condenser 6 may be of any suitable construction and as herein illustrated is a surface type having a chamber 18 with tubes 19 extending longitudinally therethrough between tube-sheets in headers 20 and 21. Depending from the chamber 18 of condenser 6 is an orifice device 22 having a wall 23 therein with an orifice 24 and the bottom of the orifice device is connected to the heat exchanger 7 by a conduit 25. The heat exchanger 7 comprises finned tubes 26 extending between spaced headers 27 and 28. A cup 29 is provided at one end of each tube 26 in the headers 27 and 28 and the cups are arranged at opposite ends of adjacent tubes with each underlying the end of the next uppermost tube so that refrigerant flows by gravity through the tubes successively from the top to the bottom of the heat exchanger. The lower ends of the headers 27 and 28 open into the top of the absorber 8. Absorber 8 is in the form of a cylindrical vessel having a plurality of vertical serpentine coils 30 arranged in side-by-side relationship therein and a liquid distributor 31 overlying the coils.

Absorption solution weak in refrigerant flows by gravity from the separating chamber 14 to the liquid distributor 31 in absorber 8 in a path of flow comprising conduit 32, outer passage 33 of liquid heat exchanger 9 and conduit 44. Absorption solution strong in refrigerant flows from the bottom of the absorber 8 to the boiler 11 of the generator 5 in a path of flow comprising conduit 45, inner passage 46 of liquid heat exchanger 9, conduit 47, reservoir vessel 48 and conduit 49. The top of the reservoir vessel 48 is vented to the separating chamber 14 by a conduit 50.

The absorber 8 and condenser 6 may be cooled by any suitable cooling medium such as water from a city water main, cooling tower or the like, which is circulated through coils 30 in absorber 8 and tubes 19 in condenser 6. The cooling water circuit comprises an inlet conduit 51 connected to a header 52 which, in turn, connects one end of the plurality of serpentine coils 30 in the absorber 8. A header 53 connects the opposite or upper ends of the plurality of serpentine coils 30 in the absorber 8 and the header is connected to header 20 of condenser 6 by a conduit 54. The outlet header 21 of condenser 6 has a discharge conduit 55. Thus, cooling water flows through the absorber 8 and condenser 6 in succession. A valve 56 is provided in the inlet conduit 51 which permits the flow of cooling water through the cooling circuit when open and stops the flow of cooling water when closed. The valve 56 may be operated either automatically or manually.

Bypass conduit 10 has one end connected to the conduit 32 of the absorption solution circuit and its opposite end connected to the header 28 of the heat exchanger 7. The lower end of the bypass conduit 10 is connected to the conduit 32 below the level $X_1$ at which liquid stands during operation of the apparatus on a cooling cycle to provide a liquid trap as later explained in detail.

In accordance with the present invention, a safety device is provided for venting the interior of the apparatus to the atmosphere when an excessive pressure occurs therein. The safety device comprises a liquid trap containing a material which is solid at atmospheric temperatures and heated to melting temperature during operation of the apparatus. The liquid trap may be heated by arranging it in thermal contact with a portion of the apparatus operable at a temperature above the melting point of the material in the trap such as the generator or heat exchanger 7 or may be heated by some extraneous source of heat. The trap is so constructed and arranged as to produce a liquid column of the material of a height corresponding to the venting pressure. Preferably, the end of the trap which is open to the atmosphere has an element for receiving the liquid material from the trap when the apparatus vents and for delivering the material back to the trap when the pressure in the apparatus is relieved so as to maintain a liquid seal at all times even when venting.

In the illustrated embodiment the safety device is in the form of a U-tube 60 arranged in thermal contact with the exterior of the lift tube 15 as by welding or brazing its upright legs 61 and 62 thereto. The upper end of leg 61 projects through the bottom wall of the separating chamber 14 and upwardly into the vapor space and the end of the other leg 62 is open to the atmosphere. The U-tube 60 contains a metal alloy which is solid at atmospheric temperatures and fluid at the operating temperatures of the lift tube 15. Any suitable low melting temperature alloy may be selected such as Wood's metal comprising bismuth, lead, tin, and cadmium, and having a melting temperature of 154° F. Surrounding the lift tube 15 at the upper end of leg 62 of the U-tube 60 is a reservoir vessel 63 in the form of a cup and of sufficient volume to receive and contain all of the alloy in the two legs 61 and 62. A series of baffles 64 are provided in the cup to retard the upward flow of the molten alloy while permitting vapor to bubble therethrough as it vents from the apparatus to the atmosphere. Thus, the reservoir vessel 64 maintains a body of the molten alloy to seal the interior of the apparatus from the atmosphere even when venting and returns the material back into the liquid trap after the pressure in the apparatus has been relieved. One form of the invention having now been described in detail, the mode of operation of the apparatus and safety device is explained as follows.

When cooling is desired, the valve 56 in the cooling water circuit is opened to permit the flow of cooling water through the serpentine coils 30 in the absorber 8 and tubes 19 of the condenser 6. To initiate operation, fuel is supplied to the burner 13 and ignited by any suitable means such as a pilot. The heat from the flame and products of combustion are transmitted through the wall of the flue 12 to expel refrigerant vapor, water, from the solution of absorbent, lithium bromide, in the boiler 11. The expelled vapor escapes from and flows upwardly through the lift tube 15 in continuous vapor phase at sufficient velocity to carry droplets of liquid absorbent suspended therein to the separating chamber 14 at a constant rate. The high velocity vapor issuing from the upper end of the lift tube 15 impinges against the baffles 16 to separate the liquid absorbent from the refrigerant vapor. The refrigerant vapor flows from the separating chamber 14 through the vapor pipe 17 into the chamber 18 of condenser 6 where it contacts the relatively cold tubes 19 and is condensed to a liquid. Liquid refrigerant flows from the condenser 6 through the orifice 24 and conduit 25 into the uppermost tube or tubes 26 of the heat exchanger 7, the orifice permitting the flow of liquid refrigerant and non-condensable gases while maintaining a difference in pressure between the condenser and heat exchanger. The liquid refrigerant delivered to the heat exchanger 7 constituting the evaporator of an absorption refrigeration system flows by gravity through successive tubes 26 from the top to the bottom thereof.

Simultaneously, absorption solution weak in refrigerant flows by gravity from the separating chamber 14 to the liquid distributor 31 in absorber 8 in a path of flow comprising conduit 32, outer passage 33 of liquid heat exchanger 9 and conduit 44. The absorbent is delivered by the distributor 31 onto the top of the relatively cold serpentine coils 30 and flows by gravity over the outer periphery of each tube section from the top to the bottom of the coils. Due to the affinity of the refrigerant, water, for the absorbent, lithium bromide solution, the refrigerant vapor is absorbed in the absorption solution which reduces the vapor pressure and temperature at which the refrigerant evaporates in the heat exchanger 7. As the refrigerant evaporates in the tubes 26 at a low vapor pressure and temperature, it removes heat from a medium such as air to be cooled which flows over the exterior of the tubes. Refrigerant vapor flows through the tubes 26 into the headers 27 and 28 and through the headers into the absorber 8 where it is absorbed in the absorption solution as fast as it is evaporated, and the heat of absorption is transmitted to and removed by the cooling water flowing through the serpentine coils 30.

The generator 5 and condenser 6 operate at one pressure corresponding to the vapor pressure of the refrigerant at the temperature of the cooling water in the condenser 6 and the evaporator 7 and absorber 8 operate at a lower pressure corresponding to the vapor pressure of the refrigerant in the absorption solution. The difference in pressure between the condenser 6 and evaporator 7 is maintained by the orifice 24 and the pressure difference between the absorber 8 and generator 5 is maintained by liquid columns in the conduits 44 and 45. For example, a liquid column will be maintained in the conduit 44 between the level W at the top of conduit 44 and a level $X_1$ in conduit 32 connected thereto through the liquid heat exchanger 9; a column of liquid will be maintained in the conduit 45 between the level Y and the level Z in the leveling vessel 48; and a liquid column will be maintained in the bypass conduit 10 between the levels W and $X_1$.

When it is desired to operate the apparatus as a heating system the valve 56 in the cooling water circuit is closed. When heat is supplied to the generator 5 vapor is expelled from solution in the boiler 11 and flows upwardly through the lift tube 15, separating chamber 16 and vapor pipe 17 into the condenser 6 but its flow from the condenser is restricted by the orifice 24. As the condenser 6 is not cooled the pressure of the vapor in the generator 5 increases and depresses the liquid level in conduit 32 to the level $X_2$ below the end of the bypass conduit 10 and the vapor then escapes through the bypass conduit into the header 28 of the heat exchanger 7. The vapor flows from the header 28 into the tubes 26 to heat the medium to be conditioned flowing over the exterior of the tubes. Heat transferred from the vapor to the medium to be conditioned condenses the vapor in the tubes 26 which flows from the lowermost tube into the absorber 8 and from the absorber back to the generator 5 as previously explained.

During transit of the unitary self-contained apparatus from the place where it is manufactured to the place where it is to be used, the metal alloy in the U-tube 60 is in solid phase and plugs the tube to seal the apparatus from the atmosphere. When the apparatus is installed at the place where it is to be used and the generator 5 is heated, heat from the vapor flowing through the lift tube 15 is transmitted through the walls of the lift tube and walls of the U-tube 60 to melt the alloy which becomes liquid. If the apparatus is operating on a cooling cycle the pressure in the separating chamber 14 is below atmospheric pressure, for example, 50 mm. Hg absolute, so that a liquid column of a height $h_1$ is produced in the leg 61 of the U-tube to balance the difference in pressure, see Figure 2. The leg 61 is of a height greater than that corresponding to an atmosphere of pressure so that the alloy cannot enter the apparatus. On the other hand, when the apparatus is operated on a heating cycle the pressure in the apparatus may be at or above atmospheric pressure, for example, from 700 mm. Hg to 1000 mm. Hg absolute. When operating above atmospheric pressure the U-tube will produce a liquid column in the leg 62 of a height corresponding to the pressure above atmospheric. At the critical pressure at which it is desired to vent the apparatus on either a cooling or heating cycle a column of the liquid will be produced in the leg 62 of a height $h_2$. When the pressure exceeds the critical pressure corresponding to the column $h_2$ of alloy, the liquid trap will blow and the liquid will flow upwardly through the leg into the reservoir cup 63. The flow of the molten alloy is impeded by the baffles 64 so that all of the alloy is retained in the reservoir cup 63 and vapor from the apparatus bubbles therethrough. However, the cup 64 will maintain a body of the molten alloy of a height $h_3$ to at all times maintain a seal between the apparatus and the atmosphere. When the pressure in the apparatus is relieved the molten alloy in the cup 63 will flow back into the U-tube 60 and form a trap as previously explained. It will be understood that the safety device may be made to vent the apparatus at any desired critical pressure by varying the height of the leg 62 of the U-tube and thereby varying the height of the liquid column it will support.

It will now be observed that the present invention provides a safety device in the form of a liquid trap containing a material which is solid at atmospheric temperature and liquid at the operating temperature of the apparatus. It will also be observed that the present invention provides a safety device in the form of a U-tube arranged in thermal contact with a heated portion of the apparatus and containing a low melting temperature alloy. It will still further be observed that the present invention provides a safety device which is of simple and compact construction and maintains a seal between the apparatus and the atmosphere under all operating conditions while permitting the apparatus to vent to the atmosphere at excessive pressures.

While a single embodiment of the invention is herein illustrated and described, it will be understood that modifications may be made in the construction and arrangement of elements without departing from the spirit or scope of the invention. Therefore, without limitation in this respect, the invention is defined by the following claims.

I claim:

1. In a closed heat operated apparatus containing a working medium, a safety device for hermetically sealing the apparatus during inoperative periods and venting the apparatus at a predetermined pressure therein during operative periods comprising a trap connecting the interior of the apparatus to the ambient atmosphere, a material in said trap which is solid at atmospheric temperatures, and means for heating said trap above the melting temperature of said material during operation of the apparatus, said trap having an upright leg for producing a liquid column of the material of a height corresponding to the venting pressure.

2. The apparatus as set forth in claim 1 where said heating means is a part of the apparatus.

References Cited in the file of this patent

UNITED STATES PATENTS

| | | |
|---|---|---|
| 1,982,474 | Mesinger | Nov. 27, 1934 |
| 2,247,566 | Walton | July 1, 1941 |